UNITED STATES PATENT OFFICE.

CARL D. EKMAN, OF LONDON, ENGLAND.

METHOD OF OBTAINING COLORING-MATTERS.

SPECIFICATION forming part of Letters Patent No. 282,971, dated August 14, 1883.

Application filed May 17, 1883. (No specimens.) Patented in England November 29, 1882, No. 5,671.

*To all whom it may concern:*

Be it known that I, CARL DANIEL EKMAN, a citizen of Sweden, residing at 57½ Old Broad street, in the city of London, England, have invented a certain new and Improved Method of Obtaining Coloring-Matters, (for which I have received Letters Patent in England, No. 5,671, dated November 29, 1882;) and I do hereby declare that the following is a full, clear, and exact description of the invention, which will enable others skilled in the art to which it appertains to make and use the same.

The object of this invention is the extraction of coloring-matters from the vegetable substances in which they are contained, with a view, first, to obtain a larger yield of coloring-matter than can be obtained by the processes hitherto employed; second, to obtain the coloring-matter in a more soluble and more stable condition than that obtained by the usual processes; third, to obviate as far as possible (during the process of extraction and evaporation) the degradation of the coloring-matter by oxidation; fourth, the treatment of vegetable-dye wares which have already been treated by one of the known methods with a view to the further extraction of coloring-matter.

The raw material will or will not be required to undergo a preliminary preparation according to its peculiarities. Compact substances—such as dye-woods—must be treated by some mechanical mode of disintegration, the one condition necessary being that during the subsequent process, which I am about to describe, the raw material may be easily permeable by the liquid employed. The raw material in this form is then placed in a suitable vessel or boiler so constructed that it shall be capable of gradual heating, of sufficient strength to bear the necessary pressure or tension, and, if necessary, lined with lead or other suitable substance, that it may be capable of resisting the action of the liquid employed. The vessel or boiler is then charged with the solution or liquid.

The liquid consists of a solution containing sulphurous acid and a base. As to the base employed I have obtained good results with soda, magnesia, and potash; but other bases may be used provided that they fulfill more or less the following conditions: first, that in presence of sulphurous acid under the conditions employed it has no deleterious effect on the coloring-matters operated upon; second, when the operation is so complete that it shall be of such a nature that it may be removed from the tinctorial solutions obtained in any suitable form, or that its presence in the extracts may not be objectionable during their subsequent employment. I have found that the base generally to be preferred is soda.

The boiler or vessel being charged with raw material and solution, it is closed and made tight in the usual way. It is then gradually heated until the pressure exceeds that of the atmosphere. The degree of pressure to which it will be necessary to expose the contents of the boiler will depend to a considerable extent on the nature of the material operated upon, and the more or less perfect extraction of the coloring-matters which may be desirable. In the treatment of dye-woods—for instance, logwood—if it is desired to obtain coloring-matter containing a small proportion only of the other extractive matters of the wood, it will be advisable in boiling not to exceed a pressure of about thirty pounds to the square inch; but if the admixture of the other constituents of the wood with the coloring-matter is not objectionable, the boiling-pressure may be increased beyond thirty pounds. If logwood be boiled for about four hours at ninety pounds pressure, nearly the whole of the coloring and incrusting matters will be dissolved, so that a small proportion only will remain in the cellulose. Accordingly, it will be at the option of the operator to use a greater or less pressure, according to the quality of the extract and the shades of color desired.

The proportion of sulphurous acid to base which I have found most advantageous is about two equivalents of the former to one of the latter, or about the proportions which form the salt commonly called the "bisulphite."

The quantity of chemicals required will mainly depend upon the pressure to which it is intended to subject the contents of the boiler. When I have boiled at about thirty pounds pressure, I have found that a quantity of bisulphite of soda equal to about five per cent. of the dry weight of the dye-wood treated gives satisfactory results; but when I have subjected similar dye-wood to ninety pounds pressure, I have found it necessary to increase the quantity of chemicals, and in this case have used about twenty per cent. When I have treated dye-woods at thirty pounds pressure under the conditions mentioned above, I have obtained the best results by continuing the treatment at that pressure for about five hours; but when I have used the higher pressure of ninety pounds, I have found a treatment of less than four hours sufficient to produce the desired results.

The solutions obtained from dye-woods—such as logwood, brazil-wood, and sapan-wood—if the operation of extraction has been properly performed, contain the coloring-matter in an unoxidized condition; but the color effects of these woods may be produced by suitable modes of development. In some cases it may be convenient, first, partially to extract a portion of the coloring-matter at a low pressure, and afterward complete the extraction with a fresh solution at a higher pressure, the two extracts being then of different qualities and shades.

I am aware that the sulphites and bisulphites of soda, lime, potash, &c., have been used in the manufacture of tanning materials and for the preservation of the same, instances of such uses being shown in English Patent No. 677 of 1880, and United States Patents numbered 178,919 and 193,443; but I make no claim to the processes therein described.

It will be understood that although I have described above the proportions and quantities of chemicals, degrees of pressure, and duration of treatment which I have used with good results, I do not confine myself to these; but

What I claim as of my invention is—

The extraction of coloring-matters from vegetable substances which contain them by boiling under pressure in a solution containing sulphurous acid and a base or alkali.

CARL DANIEL EKMAN.

Witnesses:
WILLIAM HENRY JEFFERS,
LEMON HALL.